(No Model.) 3 Sheets—Sheet 3.
J. W. TURNER.
BAND CUTTER AND FEEDER FOR THRASHING MACHINES.
No. 347,280. Patented Aug. 10, 1886.
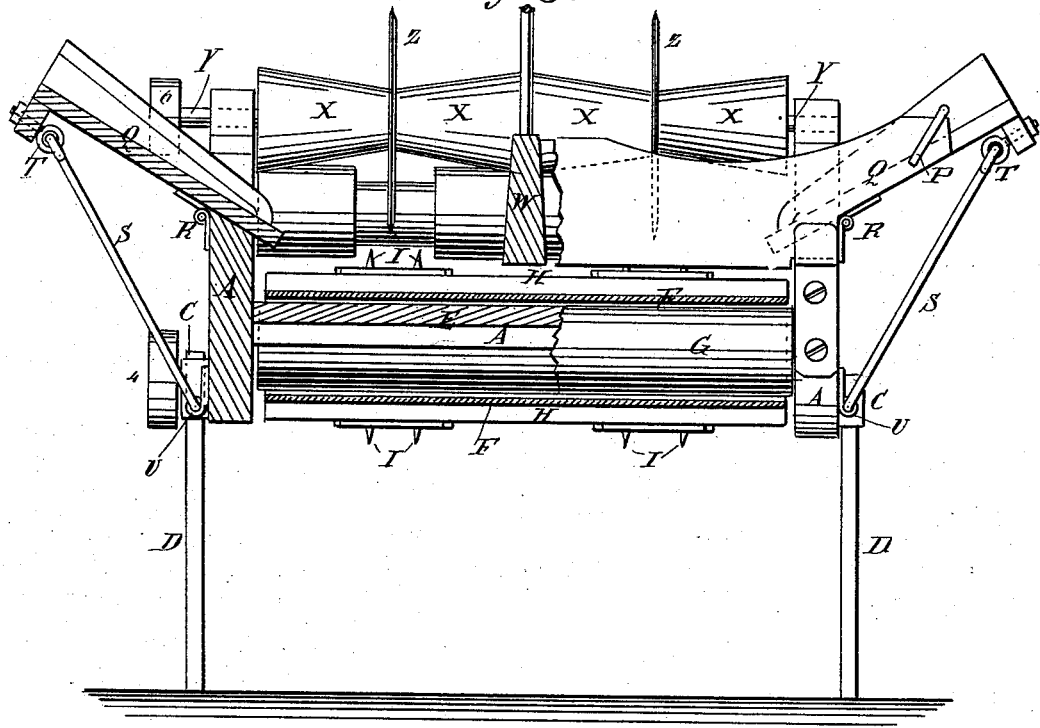
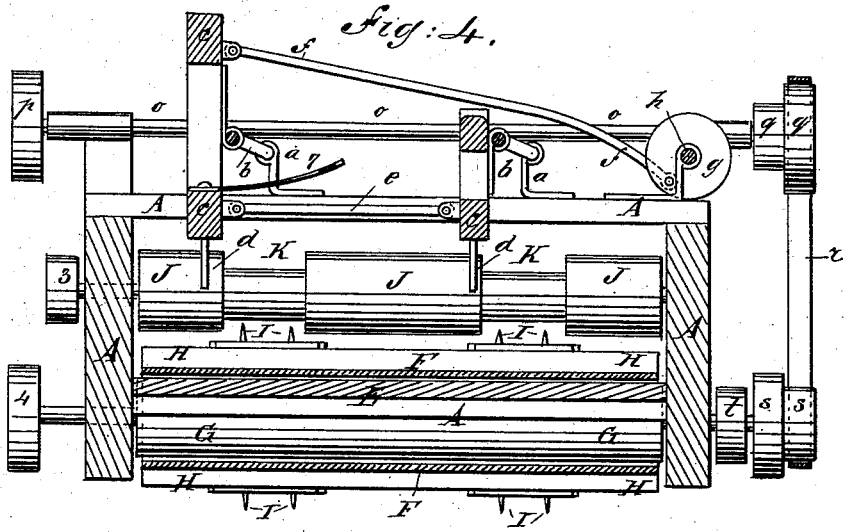
WITNESSES:
INVENTOR:
J. W. Turner
BY
ATTORNEYS.

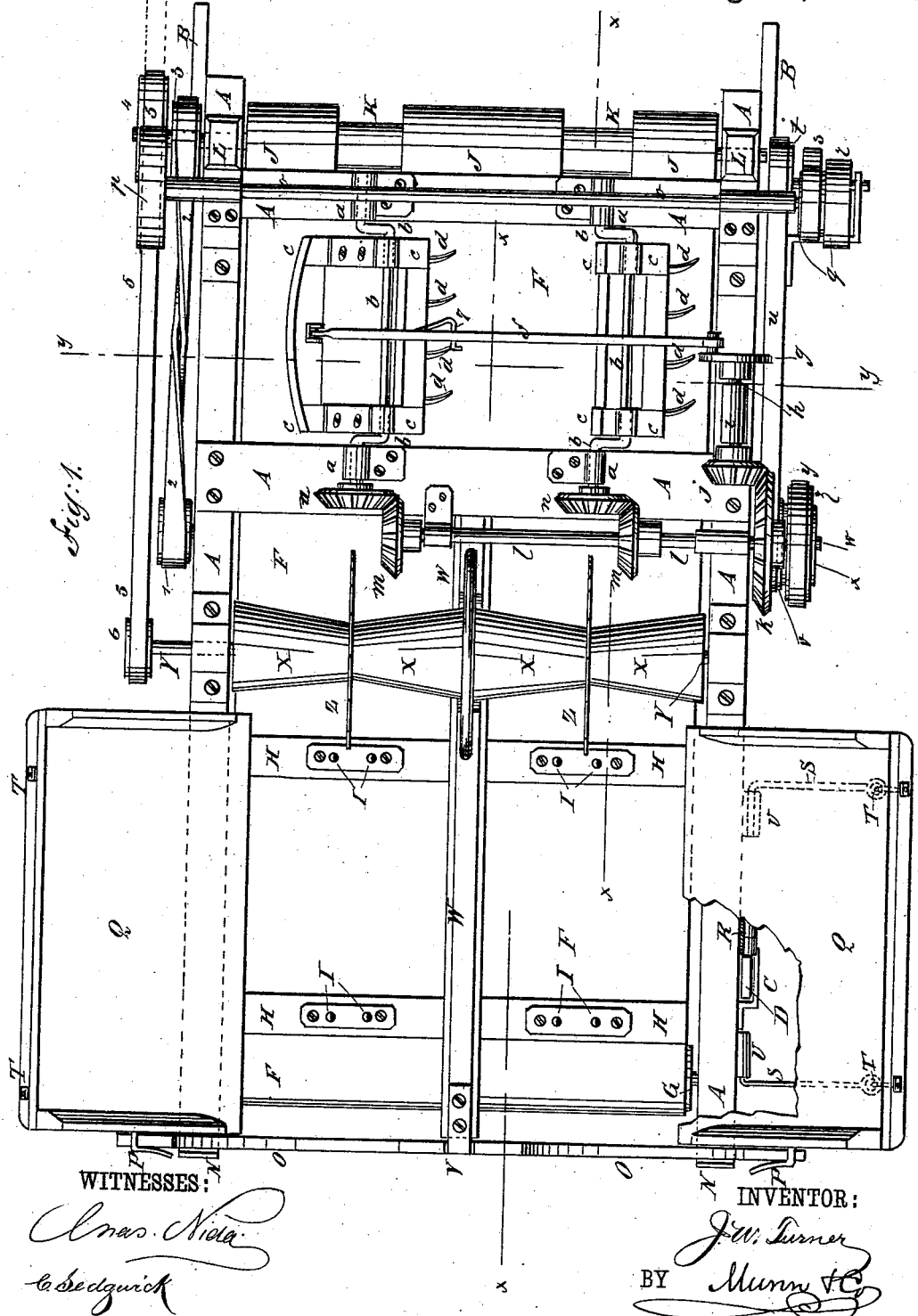

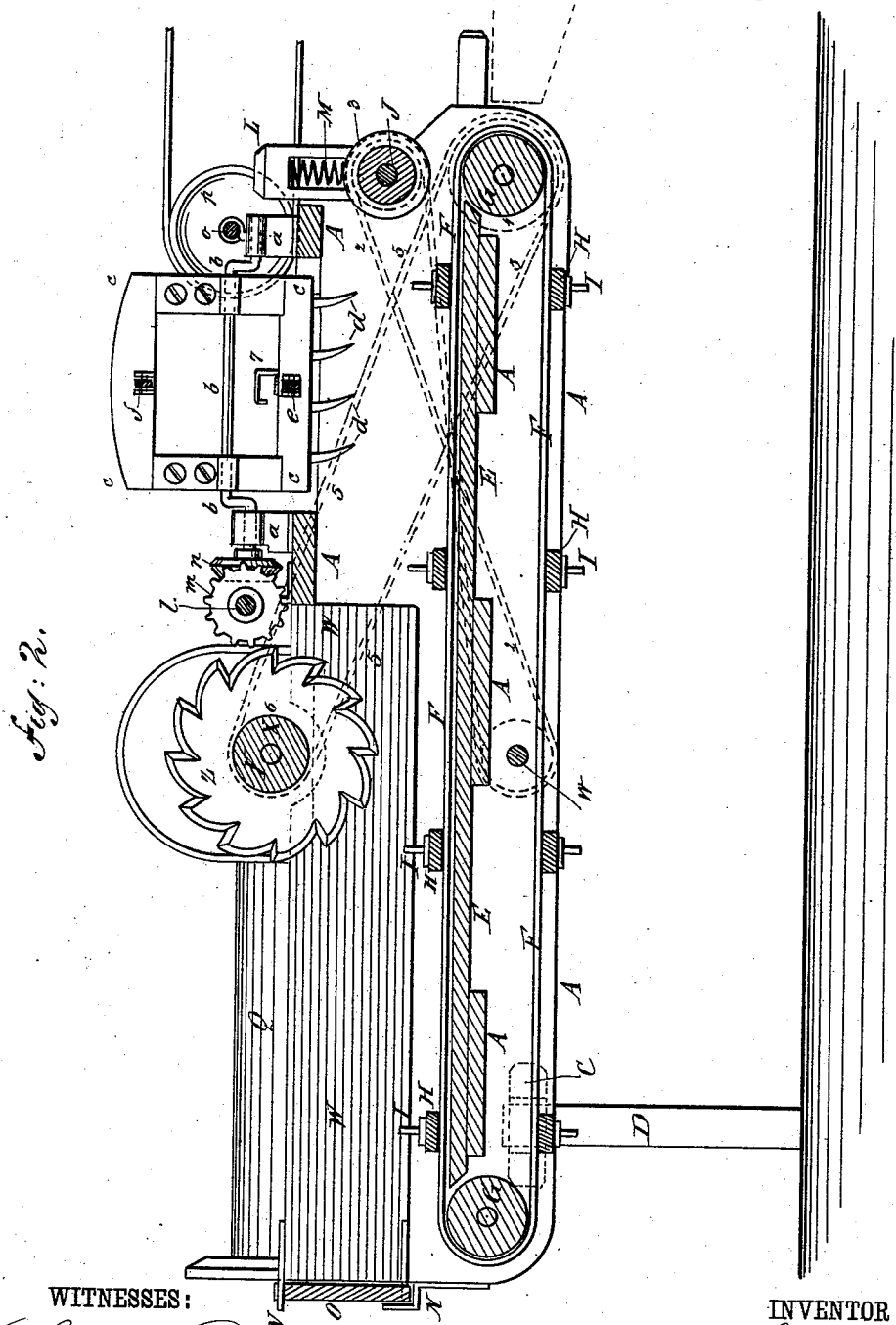

UNITED STATES PATENT OFFICE.

JACOB W. TURNER, OF MIDDLE POINT, OHIO.

BAND-CUTTER AND FEEDER FOR THRASHING-MACHINES.

SPECIFICATION forming part of Letters Patent No 347,280, dated August 10, 1886.

Application filed November 6, 1885. Serial No. 182,031. (No model.)

*To all whom it may concern:*

Be it known that I, JACOB W. TURNER, of Middle Point, in the county of Van Wert and State of Ohio, have invented a new and useful Improvement in Band-Cutters and Feeders for Thrashing-Machines, of which the following is a full, clear, and exact description.

Reference is to be had to the accompanying drawings, forming a part of this specification, in which similar letters of reference indicate corresponding parts in all the figures.

Figure 1 is a plan view of one of my improved machines, part being broken away. Fig. 2 is a longitudinal vertical section of the same, taken on the broken line *x x x x*, Fig. 1. Fig. 3 is a front end elevation of the same, partly in section. Fig. 4 is a transverse vertical section of the same, taken through the line *y y*, Fig. 1.

The object of this invention is to improve the construction of the band-cutters and feeders for thrashing-machines for which Letters Patent No. 319,940 were issued June 9, 1885, to J. W. Turner and E. W. Strack, in such a manner as to make them more convenient in use and more reliable in operation.

The invention consists in the construction and combination of various parts of the machine, as will be hereinafter fully described.

A represents the frame of the machine. To the rear ends of the side bars of the frame A are attached bars B, for connecting the machine with a thrasher. To the forward parts of the side bars of the frame A are attached keepers C, to receive the upper ends of legs D, for supporting the forward end of the machine. To the side bars of the frame A is attached a close bottom, E, to support the upper part of the endless apron F in a horizontal position while carrying the grain to a thrashing-cylinder.

The endless apron F passes around rollers G, journaled to the end parts of the side bars of the frame A, and to the said endless apron are attached at suitable distances apart cross-bars H, which are provided with teeth I, to engage with the grain and carry it to the cylinder.

Above the rear roller G is placed a feed-roller, J, to feed the grain regularly to the thrashing-cylinder and prevent it from being drawn into the said thrasher too fast, and being thus liable to choke the thrasher. The feed-roller J is provided with annular grooves K, to allow the teeth I of the cross-bars H to pass without coming in contact with the said roller. The feed-roller J is journaled in bearings in slotted standards L, attached to the rear ends of the side bars of the frame A, and is held down by spiral springs M, or other suitable springs, interposed between the said bearings and the caps of the said standards, so that the said roller can adjust itself to the quantity of grain being carried forward.

To the forward ends of the side bars of the frame A are attached keepers N, in which rests the lower edge of the end board, O, which is further secured in place by buttons P, pivoted to the edges of the inclined feed-tables Q, so that the said end board can be readily detached when required.

The upper edges of the forward parts of the side bars of the frame A are recessed to receive the inclined feed-tables Q, which are connected with the said side bars by hinges R. The feed-tables Q are supported in place when in use by brace-hooks S, the upper ends of which are hinged to the outer parts of the said tables by eye-screws T or other suitable means. The lower ends of the brace-hooks S are hooked into the eyes of eye-plates U, attached to the lower parts of the side bars of the frame A, so that the said brace-hooks can be readily unhooked to allow the feed-tables Q to be turned down when not required for use.

The upper and lower edges of the end board O, at their centers are recessed to receive metal straps V, attached to the upper and lower edges of the forward end of the division-board W, to hold the said forward end from lateral or vertical movement. The rear end of the division-board W is secured to a cross-bar of the frame A. The upper edge of the division-board W, near its inner end, is recessed to receive the two pairs of truncated conical rolls X, placed upon the shaft Y, upon the opposite sides of the cutters Z, attached to the said shaft Y. The conical rolls X are arranged with their smaller ends next the cutters Z, so that the said rolls will tend to move the bundles of grain passing beneath them toward the cutters Z, and thus insure the cutting of the bands. The cutters Z are made with teeth curved upon one edge and straight upon the other, as shown in Fig. 2, and sharpened upon both edges, so that the said cutters can be rotated in either direction, as may be desired, and will cut off any grain-stalks that may tend to wind about them. The shaft Y revolves in bearings attached to the upper edges of the side bars of the frame A.

In bearings $a$, attached to the upper cross-bars of the frame A, are journaled the arms of cranks $b$, to which are hinged the frames $c$. To the bottom bars of the frames $c$ are attached teeth $d$, to engage with the bundles of grain after their bands have been cut, and spread the stalks evenly over the endless feed-apron F. To the rake-frames $c$, below the cranks $b$, are hinged the ends of a connecting-rod, $e$, to hold the said rake-frames $c$ parallel with each other and cause them to move together. One of the rake-frames $c$ is extended above its crank $b$, and to its top bar is hinged the end of a connecting-rod, $f$, the other end of which is pivoted to the crank-pin of a crank or crank-wheel, $g$, attached to the end of a short shaft, $h$. The shaft $h$ is journaled in a long bearing, $i$, attached to the edge of a side bar of the frame A, and to its other end is attached a beveled gear-wheel, $j$, the teeth of which mesh into the teeth of the beveled gear-wheel $k$, attached to the shaft $l$. The shaft $l$ revolves in bearings attached to the frame A, and to it are attached beveled gear-wheels $m$, the teeth of which mesh into the teeth of the beveled gear-wheels $n$, attached to the cranks $b$, so that the rakes will have at the same time an oscillating movement and an up-and-down movement, and will thus spread the grain evenly over the endless apron. To the bottom bar of the extended rake-frame $c$ is attached the end of a spring, 7, which projects into such a position that its free end will come in contact with the connecting-rods $e$ $f$ at each end of the lateral movement of the rake-frames, and will thus relieve the said rake-frames from the jar as the direction of their lateral movements is reversed.

To the upper edges of the side bars of the frame A are attached bearings, in which revolves a shaft, $o$, to one end of which is attached a pulley, $p$, to receive a belt from the driving mechanism of the thrasher. To the other end of the shaft $o$ is attached a cone-pulley, $q$, around which passes a belt, $r$. The belt $r$ also passes around a cone-pulley, $s$, attached to a journal of the forward roller G, that carries the endless feed-apron F, so that by shifting the said belt $r$ the said endless feed-apron can be driven at a greater or less speed, as the condition of the grain may require. To the journal of the roller G is also attached a pulley, $t$, around which passes a belt, $u$. The belt $u$ also passes around a pulley, $v$, attached to the end of a shaft, $w$, journaled to the side bars of the frame A. To the end of the shaft $w$ is also attached a pulley, $x$, around which passes a belt, $y$. The belt $y$ also passes around a pulley, $z$, attached to the end of the shaft $l$, so that the rakes will be operated from the shaft $o$. To the other end of the shaft $w$ is attached a pulley, 1, around which passes a belt, 2. The belt 2 is crossed and passes around a pulley, 3, attached to a journal of the feed-roller J, so that the said feed-roller will be driven from the said shaft $w$. To the other journal of the rear roller G, that carries the endless feed-apron F, is attached a pulley, 4, around which passes a belt, 5. The belt 5 also passes around a pulley, 6, attached to the end of the shaft Y, that carries the cutters Z and the conical washers X, so that the said cutters will be driven from the said roller.

The belt 5 may be straight or crossed, according as it may be desired to run the cutters Z in one or the other direction.

Having thus fully described my invention, I claim as new and desire to secure by Letters Patent—

1. In a band-cutter and feeder for thrashing-machines, the combination, with the frame A, the shaft $l$ and its driving mechanism, the rake-frames $c$, and the beveled gear-wheels $j$ $k$, the crank $g$, and connecting-rods $f$ $e$, for vibrating the said rake-frames, of the beveled gear-wheels $m$ $n$ and the cranks $b$, substantially as herein shown and described, whereby the said rake-frames will receive a lateral movement and an up-and-down movement at the same time, as set forth.

2. The combination, with the rake-frames $c$, the crank-shafts $b$, on which said frames are mounted, means for operating said crank-shafts, and the rod $e$, connecting the lower bars of said frames, of the crank-wheel $g$, the rod $f$, connecting the said wheel to the top of one rake-frame, and the spring 7 on the lower rail of one frame, extending in alignment with and between said connecting-rods, whereby when the frames are operated the spring will alternately strike the connecting-rods, substantially as and for the purpose set forth.

JACOB W. TURNER.

Witnesses:
C. L. IRELAND,
J. B. TEMPLE.